United States Patent
Hardage et al.

(10) Patent No.: US 11,514,919 B1
(45) Date of Patent: *Nov. 29, 2022

(54) VOICE SYNTHESIS FOR VIRTUAL AGENTS

(71) Applicant: United Services Automobile Association (USAA), San Antonio, TX (US)

(72) Inventors: David Charles Hardage, San Antonio, TX (US); Megan Sarah Jennings, San Antonio, TX (US); Samantha Sprague, Glendale, AZ (US); Joseph Kasonde, Crowley, TX (US); Abrham Tibebu Workineh, San Antonio, TX (US); Alejandra Valles, Plano, TX (US); Nelson Thomas Hittner, Austin, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 90 days.

This patent is subject to a terminal disclaimer.

(21) Appl. No.: 17/231,850

(22) Filed: Apr. 15, 2021

Related U.S. Application Data

(63) Continuation of application No. 16/924,639, filed on Jul. 9, 2020, which is a continuation of application No. 16/168,608, filed on Oct. 23, 2018, now Pat. No. 10,726,847.

(60) Provisional application No. 62/577,301, filed on Oct. 26, 2017.

(51) Int. Cl.
*H04M 1/64* (2006.01)
*G10L 17/00* (2013.01)
*G06N 20/00* (2019.01)
*H04M 3/523* (2006.01)
*G10L 15/06* (2013.01)
*G10L 17/04* (2013.01)

(52) U.S. Cl.
CPC .............. *G10L 17/00* (2013.01); *G06N 20/00* (2019.01); *G10L 15/063* (2013.01); *G10L 17/04* (2013.01); *H04M 3/523* (2013.01)

(58) Field of Classification Search
CPC ..... G10L 15/063; G10L 17/04; G10L 13/027; G10L 13/033; G10L 17/00; H04M 3/523; H04M 2203/408; H04M 3/4936; G06F 16/957
USPC .......... 379/88.01–88.3, 88.13, 265.01–266.1
See application file for complete search history.

(56) References Cited

U.S. PATENT DOCUMENTS

| | | | |
|---|---|---|---|
| 6,771,746 B2 | 8/2004 | Shambaugh et al. | |
| 7,933,387 B1 | 4/2011 | Baker, IV | |
| 8,930,815 B2 | 1/2015 | Moore | |
| 9,804,820 B2 | 10/2017 | Quast et al. | |
| 2008/0075238 A1 | 3/2008 | Winslow et al. | |
| 2017/0148073 A1* | 5/2017 | Nomula | G06F 16/957 |
| 2019/0109803 A1 | 4/2019 | Akkiraju et al. | |

* cited by examiner

Primary Examiner — Md S Elahee
(74) Attorney, Agent, or Firm — Fish & Richardson P.C.

(57) ABSTRACT

Techniques are described for generating a custom voice for a virtual agent. In one implementations, a method includes receiving information identifying a customer contacting a call center. The method includes selecting a voice for a virtual agent based on information about the customer. The method also includes assigning the voice to the virtual agent during communications with the customer.

24 Claims, 7 Drawing Sheets

VOICE SYNTHESIS FOR VIRTUAL AGENTS

CROSS-REFERENCE TO RELATED APPLICATION

This application is a continuation application of and claims priority under 35 U.S.C. § 120 to U.S. application Ser. No. 16/924,639, filed on Jul. 9, 2020, which is a continuation application of and claims priority to U.S. application Ser. No. 16/168,608, filed on Oct. 23, 2018, now U.S. Pat. No. 10,726,847, which claims priority under 35 U.S.C. § 119 to U.S. Application Ser. No. 62/577,301, filed on Oct. 26, 2017, and entitled "VOICE SYNTHESIS FOR VIRTUAL AGENTS," the entire contents of each of which are incorporated herein by reference.

BACKGROUND

A traditional call center is a centralized office used for receiving or transmitting a large volume of requests by telephone. An inbound call center is operated by a company to administer incoming product support or information inquiries from consumers.

Today, agent-assisted automation is a type of call center technology that automates elements of what the call center agent does with his/her desktop tools and says to customer's during the call using pre-recorded audio.

SUMMARY

Implementations of the present disclosure are generally directed to creating a synthetic voice for use by a virtual agent, routing calls intelligently, and voice transformation to synthesize a voice response based on a customer service representative and/or textual response.

In general, innovative aspects of the subject matter described in this specification can be embodied in methods. The methods include the act of receiving information identifying a customer contacting a call center. The methods include the act of selecting a voice for a virtual agent based on information about the customer or similar successful transactions. The method also includes the act of assigning the voice to the virtual agent during communications with the customer.

In general, another innovative aspect of the subject matter described in this specification can be embodied in methods that include the act of ensuring intelligent routing to best available customer service representative based on previously defined attributes of the call when the virtual agent should not or cannot meet the needs of the customer.

In general, another innovative aspect of the subject matter described in this specification can be embodied in methods that include the act of synthesizing a customer service representative voice to match the virtual agent for seamless transition between virtual agent and customer service representative.

Implementations can optionally include one or more of the following features alone or in combination. The methods may include the acts of receiving an intent of the customer and altering the voice based on the intent. The methods may include the acts of receiving sentiment of the customer and altering the voice based on the sentiment. The methods may include the acts of receiving a voice message from the customer service representative to the customer and altering the voice based on that information. The methods may include the acts of receiving a textual message from the customer service representative to the customer and altering the voice based on that information. Selecting the voice may include identifying a voice using a machine-learning system, where the machine-learning system is trained to accept information about the customer and identify a voice based on previous successful customer interactions. Altering the voice may include identifying a voice using a machine-learning system, where the machine-learning system is trained to accept information about the intent of the customer and identify an alteration based on previous successful customer interactions. The voice may be selected to match the voice of a customer service representative assigned to the customer for the duration of a call. The voice may be selected using a machine-learning system to match the voice of a service representative assigned to the customer is used in real-time in two-way communications with the customer.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
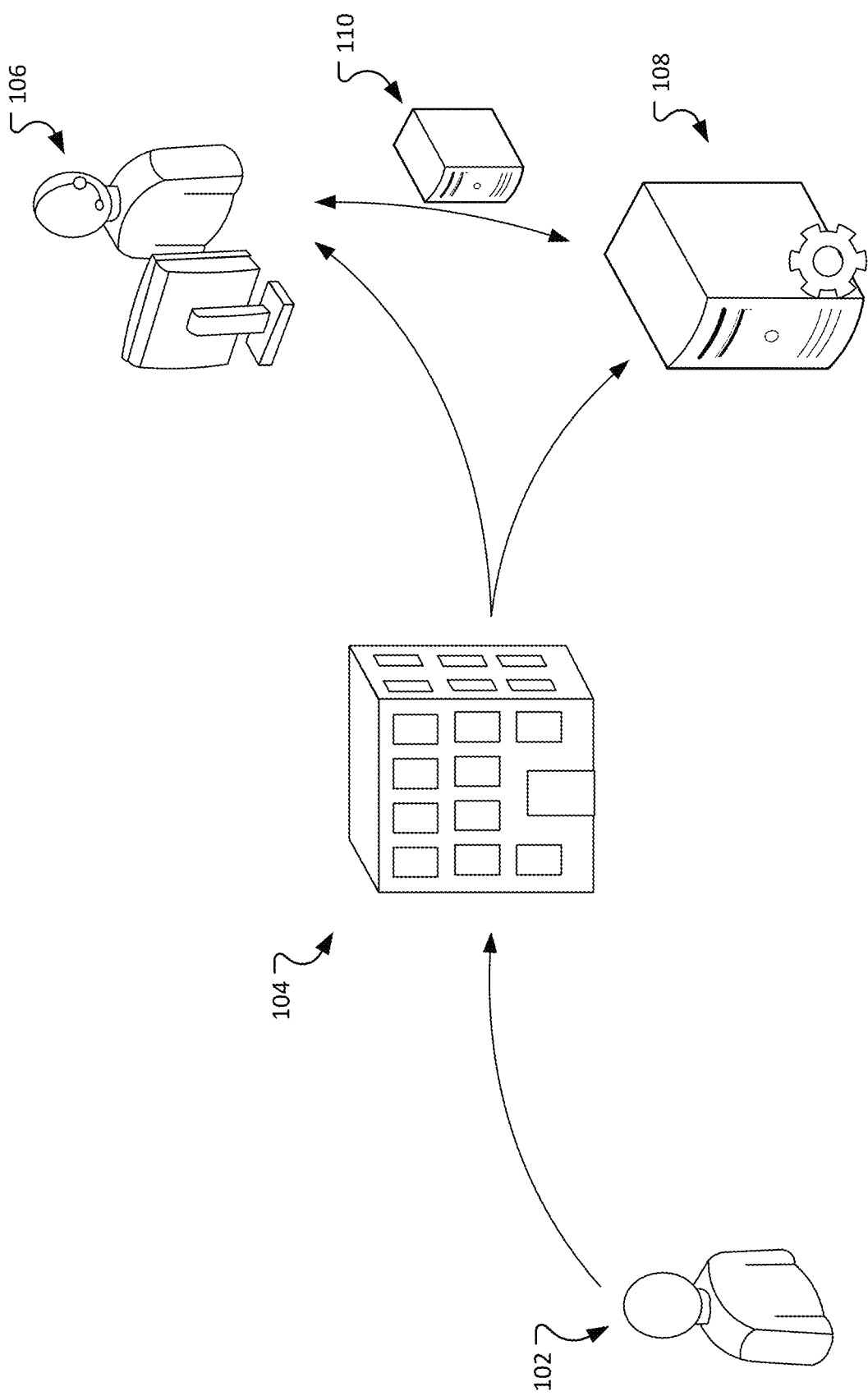
FIG. 1 illustrates an example environment in which voice synthesizer may be used.

FIG. 1 illustrates an example environment in which voice synthesis may be used. A customer 102 calls an organization 104 (for example, a call center). The customer 102 may be connected to a customer service representative 106 or a virtual agent 108. In some implementations, the virtual agent 108 may be able to perform certain tasks for the customer 102. Tasks that the virtual agent 108 can perform may include (but are not limited to) items such as checking a balance, setting up a payment, transferring funds, answering frequently asked questions, creating a new account, etc. As technology advances, the virtual agent 108 may be able to perform more complex tasks that previously required a customer service representative 106.

It is in the best interest of the organization 104 that the customer 102 has a good experience when interacting with the virtual agent 108. Accordingly, a machine-learning system 110 can be used to enhance and improve the customer's experience. In one example, a voice used by a virtual agent can be selected and adjusted based on information about the customer and why they are calling. In another example, members can be matched with a customer service representative based on the profile information about the customer. In another example, a virtual agent may be given a voice that simulates the voice of a previously assigned customer service representative where the member was satisfied with the service. In another example, a machine-learning system could be used to recommend a voice based on other customer who called about the same or similar intent.

Figure 2:
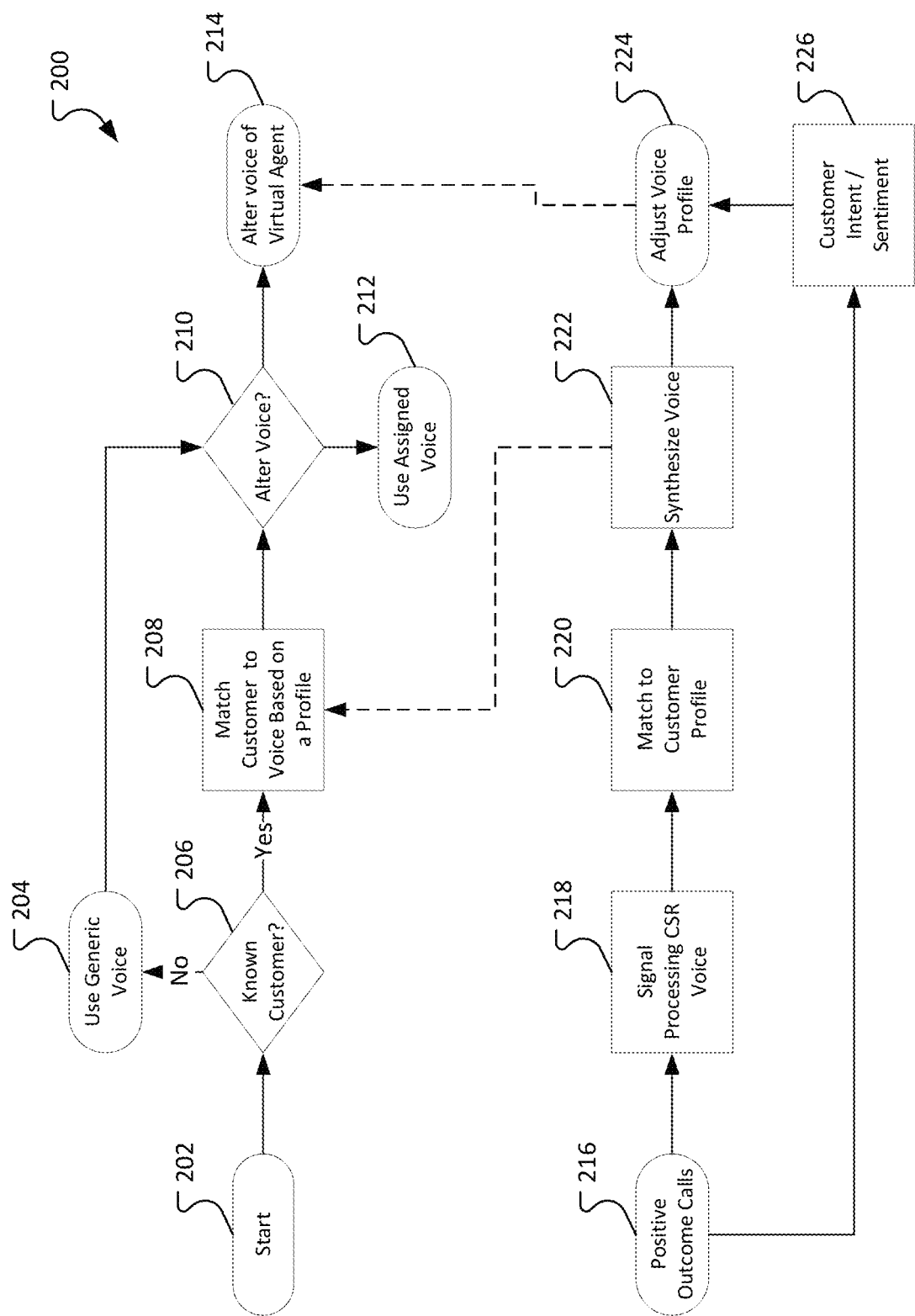
FIG. 2 is a flowchart of an example process where the voice used by a virtual agent can be selected and adjusted based on the information about the customer and why they are calling.

FIG. 2 is a flowchart 200 of an example process for selecting a voice used by a virtual agent. The voice can be selected and adjusted based on the information about the customer and why they are calling. In general, the process begins 202 when a customer calls an organization. The customer may identify himself to the organization, for example, by entering a customer number, an account number, providing login or other personal information.

In general, a virtual agent may communicate with the customer using synthesized speech. Speech synthesis generally refers to the artificial production of human speech. A computer system used for this purpose can be implemented in software or hardware products. The synthetic speech can be altered based on a desired phrasing, intonation, pitch, speech rate, volume, regional accent, male/female etc. Different synthetic speech systems can be used, including, for example, GOOGLE WAVENETS.

The process determines if the customer is a known customer 206 (for example, the customer has successfully identified himself to the organization.) If the customer is not known (such as, for example, a customer who has forgotten their login information or a customer who is new to the organization, or a customer with no previous call record), the system defaults to a "generic" voice 204. However, this generic voice may be modified real-time as we learn more about the customer's reason for calling. For example, the process may assign a voice that conforms to the "General American" accent (referring, generally, to a group of American English accents commonly attributed to a majority of Americans and popularly perceived, among Americans, as lacking any distinctly regional, ethnic, or socioeconomic characteristics), in some implementations, other accents may be used.

If the customer is known, the system may match the customer to a voice profile 208. The voice profile may be identified by using machine-learning techniques, as discussed further below. In addition to vocal characteristics, the voice profile may also include information that can be used to alter the linguistic style used by the virtual agent. As an example, one customer may prefer a more formal communication style "good morning, Mr. Customer, how may I help you?" and another customer may prefer a more casual communication style "Good morning, Mr. Customer, how was your weekend?"

Whether the customer is assigned the generic voice or the customer is matched to a voice profile, the process determines if the voice needs to be altered 210. The voice may be altered, for example, based on the reason (or intent) behind the call. For example, a customer calling about a serious and emotionally negative event (such as to report a lost or stolen credit card, file an insurance claim, report identity theft, etc.) may prefer a more serious or empathetic tone, whereas a customer calling about an emotionally positive event (such as getting insurance on a new car, report a recent wedding, the birth of a child, etc.) may prefer a more upbeat and happy tone. In some implementations, the voice may be altered during the conversation with the virtual agent. For example, the customer may disclose their intent to the virtual agent, which may cause a change in the voice.

In some implementations, the determination to alter the voice may be based, at least in part, on the selected voice. For example, if the process picks an upbeat, happy voice to match the profile, the voice may require alteration to be appropriate for a serious matter, whereas, if the system had picked a more somber serious tone, no alteration would be necessary.

If the process determines that no alteration is necessary, then the process uses the assigned voice 212, but even with the assigned voice, intent changes during the conversation can change the assigned voice's tone, inflection, etc. to match the most recent/new intent.

If the process determines that alterations are necessary, the system updates the voice profile for the virtual agent 214, but even with the assigned voice, intent changes during the conversation can change the assigned voice's tone, inflection, etc. to match the most recent/new intent.

To select a voice profile for a customer, a system may use machine-learning techniques to identify an appropriate voice profile. For example, the process tracks telephone calls that resulted in positive outcomes. Positive outcomes may be determined based on calls where the customer's intent is achieved, calls where customer satisfaction survey results are positive, calls that did not require or result in escalation, and calls where an analysis of the telephone call indicates that the customer had a positive response to the customer service representative.

For the positive outcome calls the process can perform signal processing 218 on the voice of the customer service representative (CSR) to identify a voice profile for the customer service representative and attributes of the customer taken from a customer profile 220. The attributes of the customer may include but aren't limited to, demographic information (age, gender, etc.), location information (region of the country), and channel use information (frequency of interactions using different communication channels, text, website access, mobile access, telephone calls, etc.). The voice of the customer service representative based on these attributes may further be used to change the customer service representative's voice to mimic the virtual agent 222.

In some implementations, the system may perform signal processing on the voice of the customer during the call. The characteristics of the customer's voice can be indicative of the mood of the customer. For example, whether the customer sounds happy or upset.

The voice profile and the customer profile can be included in a training set that can be used by a machine-learning system to train a machine-learning model. The machine-learning model can then be used to identify a base voice profile for a virtual agent 222.

In some implementations, the effectiveness of the different voice profiles may be monitored. For example, once the machine-learning system selects a voice profile that can be used to synthesize a voice for the virtual agent during customer interaction, the system tracks the customer response to the voice. The response of the customer (positive or negative) may be used to update and refine the machine-learning system so that voices with negative responses are used less frequently, and voices with positive responses are used more frequently.

In some implementations, customer intent and/or sentiment 226 during previously successful calls may be provided to a machine learning system to identify adjustments to the voice profile 224 appropriate for the intent and/or sentiment.

Figure 3:
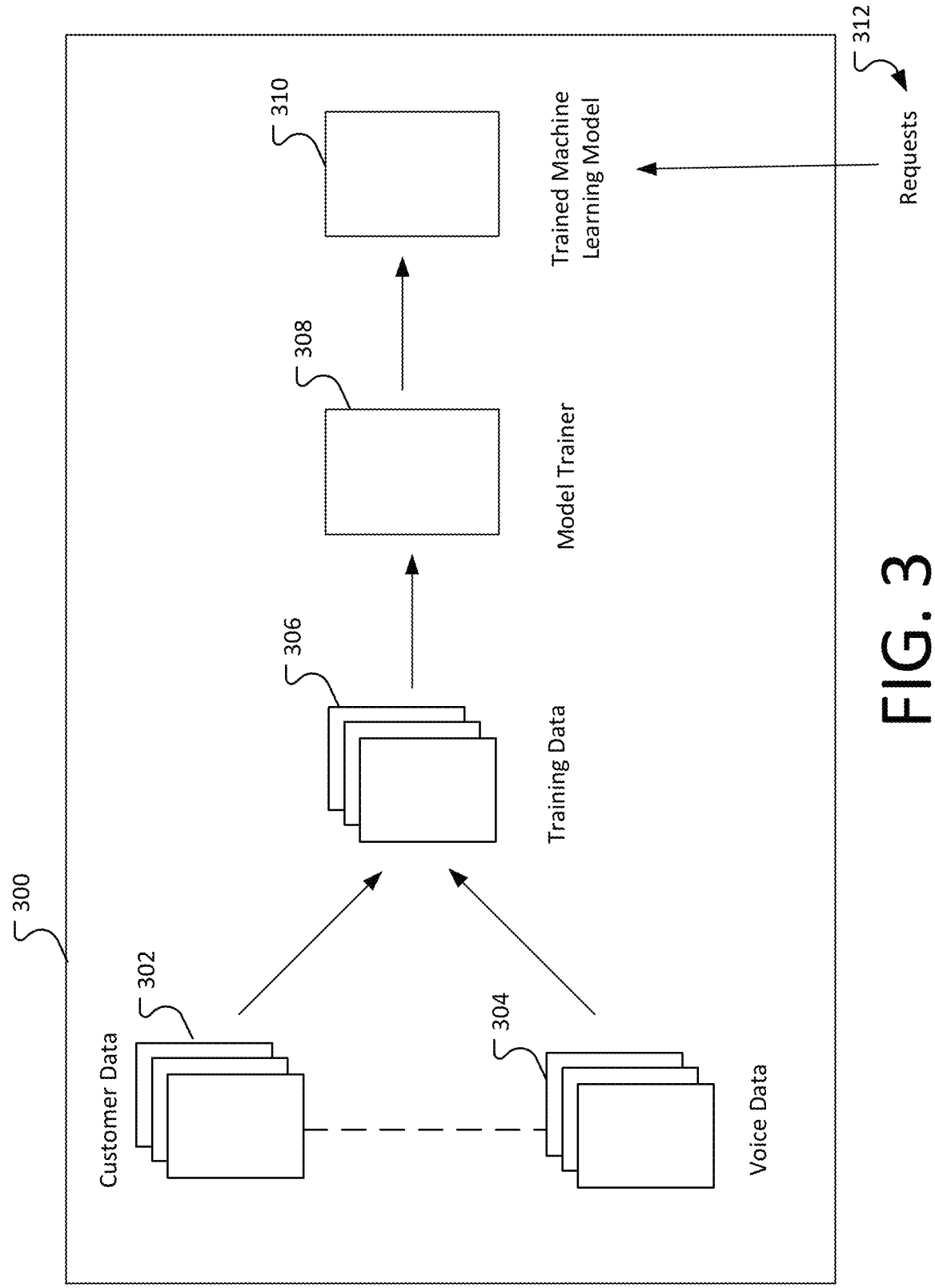
FIG. 3 depicts an example of how the machine-learning model is trained.

FIG. 3 depicts an example of training a machine-learning model. The system 300 combines customer data 302 and voice data 304 to create training data 306 In some implementations, the voice data (speech audio and voice to text transcriptions) 304 provides representative output data for the training data 306, and the customer data 302 provides representative input data for the training data 306. The training data 306 may include any suitable number of sets of training data. Each training example in the training data 306 may include customer data combined with voice data for a particular call. As described above, the customer data 302 may include customer intent data and customer voice data. Intent data can include, for example, a stated intent of the customer (the reason that the customer is making the call). Customer voice data can include information such as tone, inflection, etc. that can be indicative of the customer's mood (happy, sad, worried, etc.). Customer data can also include information about the customer such as demographic information, location information, and channel use information.

In some implementation, the intent data may be determined using an intent model. The outcome of the intent model in combination with the customer's statements and samples of the customer's voice can provide an indicator of the customer's mood.

To train a machine-learning model 310 (e.g., implemented as a neural network), the system 300 includes a model trainer 308 that employs the training data 306 for training operations. In some implementations, the trainer 306 may calculate numerical representations of training data (e.g., in vector form) for machine training. In some implementations, the machine-learning techniques include feature extraction to build different neurons within a neural network. One or more features may translate to one or more characteristics of a customer (as obtained from the customer profile). In some implementations, the machine-learning techniques will be retrained to better assist our operations based on feedback. For example, a particular feature may correspond to a particular customer characteristic, such that the strength of a characteristic leads to a particular voice profile being determined for the customer interaction. These features can be updated and changed as more information from our feedback loop become available.

Once trained, the trained machine-learning model 310 is capable of receiving and processing requests 312. For example, given a customer profile, the trained machine-learning model can identify characteristics of a voice that is likely to be appealing to the customer.

Figure 4:
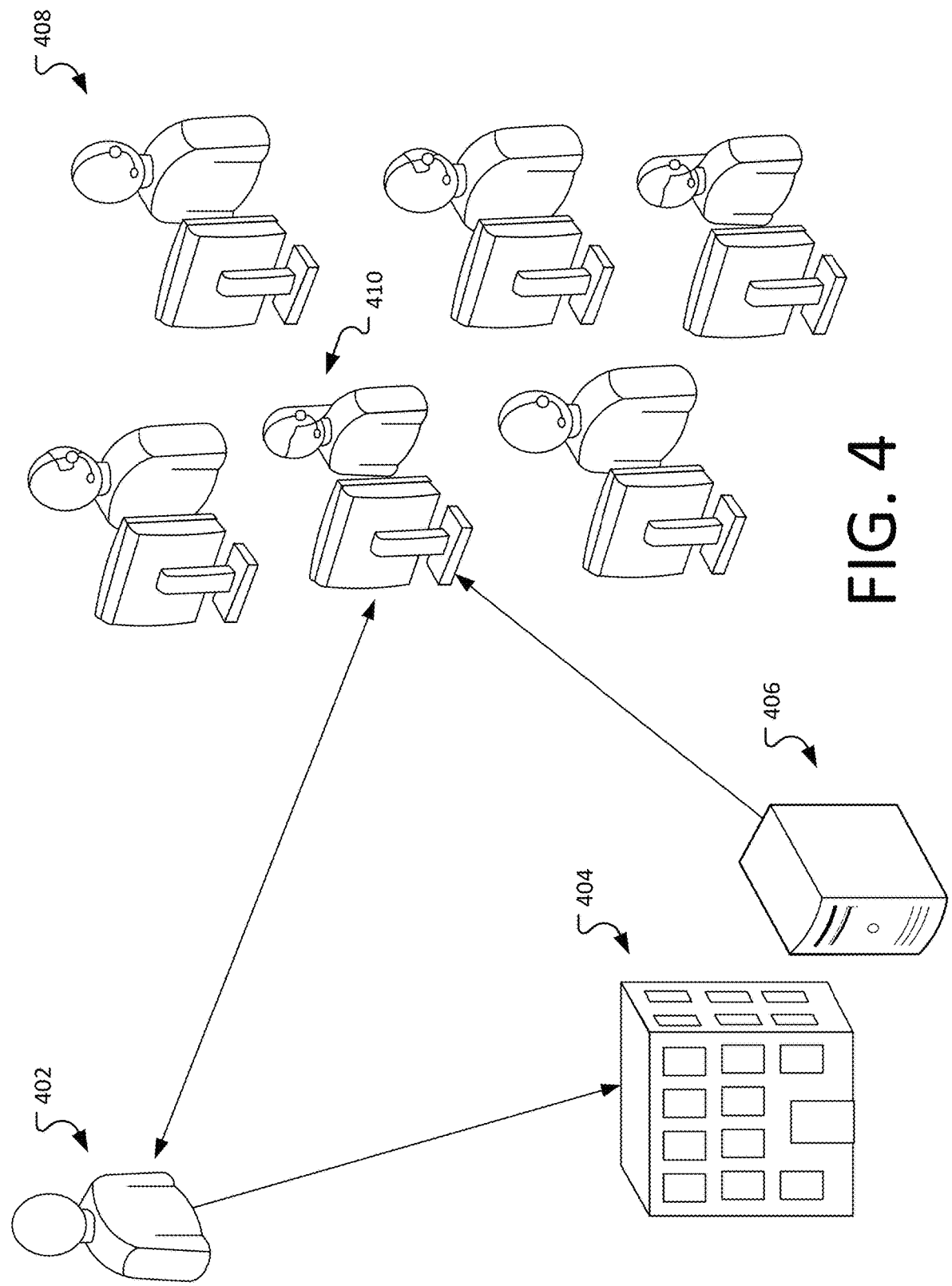
FIG. 4 illustrates an example of selecting a customer service representative based on customer information.

FIG. 4 illustrates an example of selecting a customer service representative based on customer information. A call center generally has a pool of customer service representatives 408 available to accept calls from customers. Generally, different customer service representatives may have different communication styles and different skill sets. For example, one customer service representative may speak with a Texas accent and be knowledgeable about technical aspects of working with an organizations website and applications; another customer service representative may speak with a New York accent and be knowledgeable about account management issues.

When a customer 403 calls the organization 404, a computer system 406 may take information known about the customer 402 and the customer's intent. The information may be used to match the customer 402 to a particular customer service representative 410.

In some implementations, machine learning techniques can be used to identify information about the customer, for example, a likely intent. In some implementations, machine-learning techniques may be used to match the customer with the customer service representative.

The computer system 406 may match the customer and the customer service representative based on a variety of different criteria. The criteria can include, for example, the customer's intent, the customer's preferred communication style, the preferred communication style of other customers who are similar to the customer, the availability of the customer service representative, the skills and expertise of the customer service representative, etc. In some implementations, the computer system 406 may limit the amount of additional expected wait time to speak to the representative. For example, the computer system may determine that an expected wait may be increased by up to 15, 30, or 45 seconds to connect the customer with a compatible customer service representative.

Figure 5:
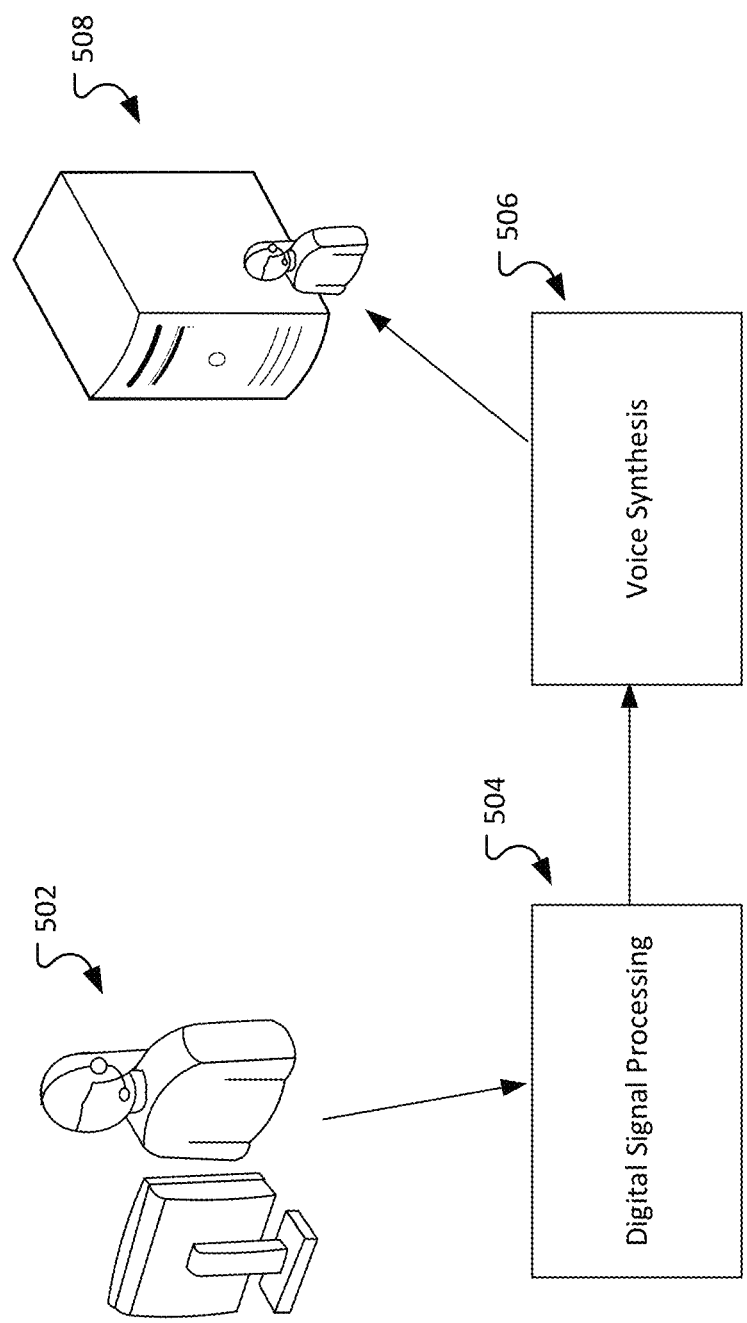
FIG. 5 illustrates an example of creating a smooth transition between a virtual agent and a customer service representative.

FIG. 5 illustrates an example of creating a smooth transition between a virtual agent and a customer service representative. When a customer service representative 508 is selected to handle the telephone call, a virtual agent can be assigned a voice that closely matches that of the customer service representatives.

For example, the customer service representative's voice may be analyzed using signal processing 504 to create a voice profile for the customer service representative 502. The voice profile may be created before the telephone call, stored, and updated periodically. For example, a voice profile may be created for the customer service representative when the customer service representative joins the organization and may be updated periodically.

In some implementations, the voice profile may be made using recorded customer service calls with the customer service representative.

A voice synthesis system 506 may generate a voice based on the voice profile of the customer service representative 502. The voice may then be used by the virtual agent 508 when the virtual agent interacts with the customer.

In this manner, once the virtual agent 508 transfers the call to the customer service representative 502 the transition is smooth. This transition could be in the form of synthesized voice or textual feedback given by the CSR resulting in the customer having a better customer service experience.

Figure 6:
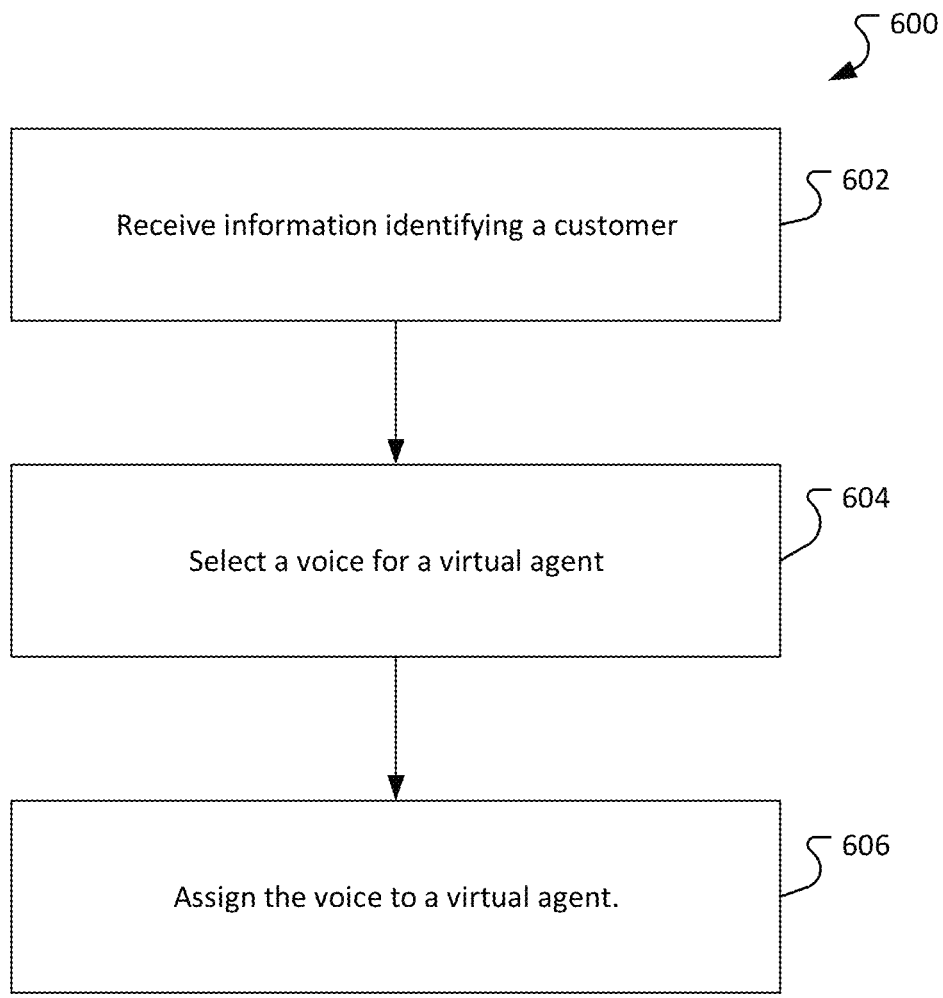
FIG. 6 is a flowchart of an example process for selecting a voice for a virtual agent.

FIG. 6 is a flowchart of an example process for selecting a voice for a virtual agent. The process may be performed by one or more computer systems including a non-transitory computer-readable media that store instructions which, when executed, cause the one or more computer systems to perform steps in the process.

The process 600 receives 602 information identifying a customer. The customer may be, for example, contacting a customer service line of an organization.

The process 600 selects 604 a voice for a virtual agent. The voice of the virtual agent may be selected by identifying a voice profile that is likely to be pleasant to the customer. The selection can be made based on information about the customer, such as demographics, location, and intent information.

The process 600 assigns 606 the voice to a virtual agent. The virtual agent then communicates with the customer using the voice.

Figure 7:
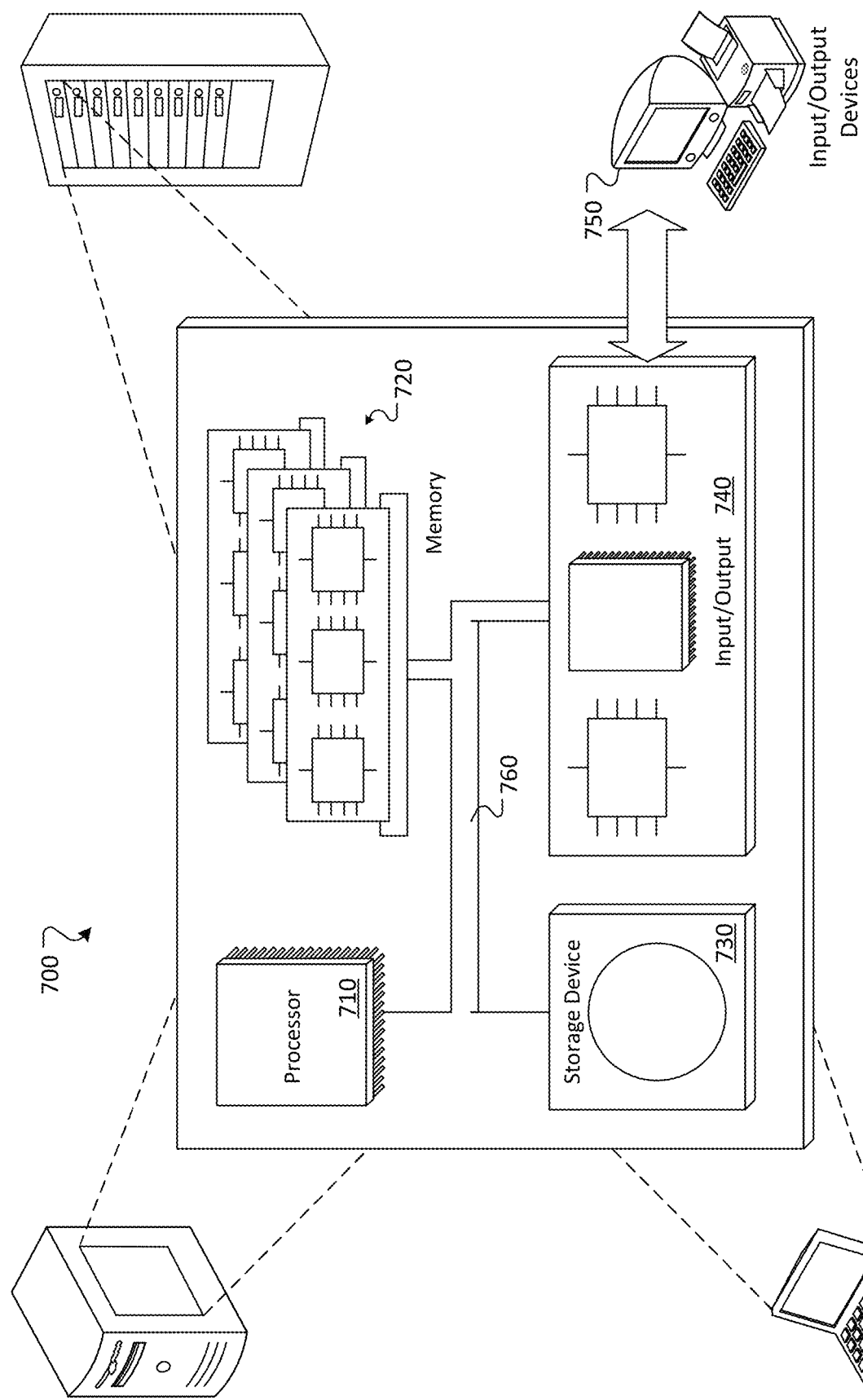
FIG. 7 depicts an example computing system, according to implementations of the present disclosure.

FIG. 7 depicts an example computing system, according to implementations of the present disclosure. The system 700 may be used for any of the operations described concerning the various implementations discussed herein. The system 700 may include one or more processors 710, a memory 720, one or more storage devices 730, and one or more input/output (I/O) devices controllable through one or more I/O interfaces 740. The various components 710, 720, 730, and 740 may be interconnected through at least one system bus 760, which may enable the transfer of data between the various modules and components of the system 700.

The processor(s) 710 may be configured to process instructions for execution within the system 700. The processor(s) 710 may include single-threaded processor(s), multi-threaded processor(s), or both. The processor(s) 710 may be configured to process instructions stored in the memory 720 or on the storage device(s) 730. The processor (s) 710 may include hardware-based processor(s) each including one or more cores. The processor(s) 710 may include general purpose processor(s), special purpose processor(s), or both.

The memory 720 may store information within the system 700. In some implementations, the memory 720 includes one or more computer-readable media. The memory 720 may include any number of volatile memory units, any number of non-volatile memory units, or both volatile and non-volatile memory units. The memory 720 may include read-only memory, random access memory, or both. In some examples, the memory 720 may be employed as an active or physical memory by one or more executing software modules.

The storage device(s) 730 may be configured to provide (e.g., persistent) mass storage for the system 700. In some implementations, the storage device(s) 730 may include one or more computer-readable media. For example, the storage device(s) 730 may include a floppy disk device, a hard disk device, an optical disk device, or a tape device. The storage device(s) 730 may include read-only memory, random access memory, or both. The storage device(s) 730 may include one or more of an internal hard drive, an external hard drive, or a removable drive.

One or both of the memory 720 or the storage device(s) 730 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 700. In some implementations, the CRSM may include a data store that provides storage of computer-readable instructions or other information in a non-transitory format. The CRSM may be incorporated into the system 700 or may be external concerning the system 700. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 710 and the memory 720 may be supplemented by, or incorporated into, one or more application-specific integrated circuits (ASICs).

The system 700 may include one or more I/O devices 750. The I/O device(s) 750 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 750 may also include one or more output devices such as a display, LED(s), an audio output device (e.g., a speaker), a printer, a haptic output device, and so forth. The I/O device(s) 750 may be physically incorporated in one or more computing devices of the system 700, or may be external concerning one or more computing devices of the system 700.

The system 700 may include one or more I/O interfaces 740 to enable components or modules of the system 700 to control, interface with, or otherwise communicate with the I/O device(s) 750. The I/O interface(s) 740 may enable information to be transferred in or out of the system 700, or between components of the system 700, through serial communication, parallel communication, or other types of communication. For example, the I/O interface(s) 740 may comply with a version of the RS-232 standard for serial ports, or with a version of the IEEE 1284 standard for parallel ports. As another example, the I/O interface(s) 740 may be configured to provide a connection over Universal Serial Bus (USB) or Ethernet. In some examples, the I/O interface(s) 740 may be configured to provide a serial connection that is compliant with a version of the IEEE 1394 standard.

The I/O interface(s) 740 may also include one or more network interfaces that enable communications between computing devices in the system 700, or between the system 700 and other network-connected computing systems. The network interface(s) may include one or more network interface controllers (NICs) or other types of transceiver devices configured to send and receive communications over one or more networks using any network protocol.

Computing devices of the system 700 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 700 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device (s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
   receiving information identifying a user;
   determining, by at least one processor, based on the information identifying the user, whether the user is a known user or an unknown user;
   in response to determining that the user is a known user, selecting, by at least one processor, a first voice for a virtual agent and assigning the first voice to the virtual agent, the first voice including at least one first sound property; and
   in response to determining that the user is an unknown user, selecting, by at least one processor, a second voice for the virtual agent, including selecting at least one second sound property for a voice that is based on the at least one first sound property and assigning the second voice to the virtual agent during a communication with the user.

2. The computer-implemented method of claim 1, further comprising:
   monitoring communications between the virtual agent and the user; and
   in response to detecting an intent of the user during the monitoring, altering the at least one first sound property or the at least one second sound property based on the detected intent.

3. The computer-implemented method of claim 1, further comprising:
   performing signal processing on voice data to identify at least one sound property of a user voice of the user, wherein selecting the first voice for the virtual agent is further based on the at least one sound property of the user voice of the user.

4. The computer-implemented method of claim 1, wherein:
   assigning the first voice to the virtual agent includes synthesizing the first voice using speech synthesis;
   assigning the second voice to the virtual agent includes synthesizing the second voice using speech synthesis; and
   the virtual agent uses at least one of the synthesized first voice and the synthesized second voice during communications with the user.

5. The computer-implemented method of claim 1, further comprising:
   receiving textual message information from a customer service representative to the user; and
   altering the voice assigned to the virtual agent based on the textual message information.

6. The computer-implemented method of claim 1, wherein selecting the second voice includes matching the user to a voice profile, the voice profile identified by:
   identifying, using one or more machine learning techniques, one or more previous communications between the user and a human service representative that resulted in a positive outcome; and
   performing signal processing on voice data representing a voice of the human service representative.

7. The computer-implemented method of claim 1, further comprising:
   monitoring communications between the virtual agent and the user;
   determining a response of the user to the voice assigned to the virtual agent; and
   updating a machine learning system based on the determined response.

8. The computer-implemented method of claim 1, wherein the first voice or the second voice is selected using a machine-learning system to match the voice of a service representative assigned to the user and is used in real-time in two-way communications with the user.

9. A system, comprising:
   at least one processor; and
   a memory communicatively coupled to the at least one processor, the memory storing instructions which, when executed by the at least one processor, cause the at least one processor to perform operations comprising:
   receiving information identifying a user;
   determining based on the information identifying the user, whether the user is a known user or an unknown user;
   in response to determining that the user is a known user, selecting a first voice for a virtual agent and assigning the first voice to the virtual agent, the first voice including at least one first sound property; and
   in response to determining that the user is an unknown user, selecting a second voice for the virtual agent, including selecting at least one second sound property for a voice that is based on the at least one first sound property and assigning the second voice to the virtual agent during a communication with the user.

10. The system of claim 9, wherein the operations further comprise:
    monitoring the communications between the virtual agent and the user; and in response to detecting an intent of the user during the monitoring, altering the at least one first sound property or the at least one second sound property based on the detected intent.

11. The system of claim 9, wherein the operations further comprise:
performing signal processing on voice data to identify at least one sound property of a user voice of the user, wherein selecting the first voice for the virtual agent is further based on the at least one sound property of the user voice of the user.

12. The system of claim 9, wherein:
assigning the first voice to the virtual agent includes synthesizing the first voice using speech synthesis;
assigning the second voice to the virtual agent includes synthesizing the second voice using speech synthesis; and
the virtual agent uses at least one of the synthesized first voice and the synthesized second voice during communications with the user.

13. The system of claim 9, wherein the operations further comprise:
receiving textual message information from a customer service representative to the user; and
altering the voice assigned to the virtual agent based on the textual message information.

14. The system of claim 9, wherein selecting the second voice includes matching the user to a voice profile, the voice profile identified by:
identifying, using one or more machine learning techniques, one or more previous communications between the user and a human service representative that resulted in a positive outcome; and
performing signal processing on voice data representing a voice of the human service representative.

15. The system of claim 9, wherein the operations further comprise:
monitoring communications between the virtual agent and the user;
determining a response of the user to the voice assigned to the virtual agent; and
updating a machine learning system based on the determined response.

16. The system of claim 9, wherein the first voice or the second voice is selected using a machine-learning system to match the voice of a service representative assigned to the user for the duration of a call and is used in real-time in two-way communications with the user.

17. One or more non-transitory computer-readable media storing instructions which, when executed by at least one processor, cause the at least one processor to perform operations comprising:
receiving information identifying a user;
determining based on the information identifying the user, whether the user is a known user or an unknown user;
in response to determining that the user is a known user, selecting a first voice for a virtual agent and assigning the first voice to the virtual agent, the first voice including at least one first sound property; and
in response to determining that the user is an unknown user, selecting a second voice for the virtual agent, including selecting at least one second sound property for a voice that is based on the at least one first sound property and assigning the second voice to the virtual agent during a communication with the user.

18. The one or more non-transitory computer-readable media of claim 17, wherein the operations further comprise:
monitoring communications between the virtual agent and the user; and
in response to detecting an intent of the user during the monitoring, altering the at least one first sound property or the at least one second sound property based on the detected intent.

19. The one or more non-transitory computer-readable media of claim 17, wherein the operations further comprise:
performing signal processing on received voice data to identify at least one sound property of a user voice of the user, wherein selecting the first voice for the virtual agent is further based on the at least one sound property of the user voice of the user.

20. The one or more non-transitory computer-readable media of claim 17, wherein
assigning the first voice to the virtual agent includes synthesizing the first voice using speech synthesis;
assigning the second voice to the virtual agent includes synthesizing the second voice using speech synthesis; and
the virtual agent uses at least one of the synthesized first voice and the synthesized second voice during communications with the user.

21. The one or more non-transitory computer-readable media of claim 17, wherein the operations further comprise:
receiving textual message information from a customer service representative to the user; and
altering the voice assigned to the virtual agent based on the textual message information.

22. The one or more non-transitory computer-readable media of claim 17, wherein selecting the second voice includes matching the user to a voice profile, the voice profile identified by:
identifying, using one or more machine learning techniques, one or more previous communications between the user and a human service representative that resulted in a positive outcome; and
performing signal processing on voice data representing a voice of the human service representative.

23. The one or more non-transitory computer-readable media of claim 17, wherein the operations further comprise:
monitoring communications between the virtual agent and the user;
determining a response of the user to the voice assigned to the virtual agent; and
updating a machine learning system based on the determined response.

24. The one or more non-transitory computer-readable media of claim 17, wherein the first voice or the second voice is selected using a machine-learning system to match the voice of a service representative assigned to the user and is used in real-time in two-way communications with the user.

* * * * *